United States Patent
Wong

(10) Patent No.: US 7,356,933 B2
(45) Date of Patent: Apr. 15, 2008

(54) MULTIFUNCTIONAL LADLE

(76) Inventor: Kwok Hung Wong, Flat 625, Wang Yat House, Lok Fu Estate, Kowloon, Hong Kong (CN)

(*) Notice: Subject to any disclaimer, the term of this patent is extended or adjusted under 35 U.S.C. 154(b) by 93 days.

(21) Appl. No.: 10/565,266

(22) PCT Filed: May 8, 2004

(86) PCT No.: PCT/CN2004/000444

§ 371 (c)(1),
(2), (4) Date: Jan. 20, 2006

(87) PCT Pub. No.: WO2005/048798

PCT Pub. Date: Mar. 7, 2005

(65) Prior Publication Data

US 2006/0174494 A1 Aug. 10, 2006

(30) Foreign Application Priority Data

Nov. 6, 2003 (CN) .................. 2003 2 0117925

(51) Int. Cl.
*A47J 43/28* (2006.01)
(52) U.S. Cl. ..................... 30/326; 30/123; 30/325
(58) Field of Classification Search ............ 30/141, 30/147, 149, 150, 324–328, 123; 99/316, 99/318, 496, 497, 499, 500; 141/110; 210/248, 210/470; D7/653, 691
See application file for complete search history.

(56) References Cited

U.S. PATENT DOCUMENTS

| 19,419 | A | * | 2/1858 | Haines .................. 100/226 |
| 1,010,795 | A | * | 12/1911 | Pfaff .................... 30/326 |
| 1,334,169 | A | * | 3/1920 | Royer ................... 30/325 |
| 1,474,443 | A | * | 11/1923 | Rhyne ................... 30/326 |
| 1,759,512 | A | * | 5/1930 | Heinrich et al. ......... 99/500 |
| 1,969,162 | A | * | 8/1934 | Smith ................... 30/141 |
| 2,552,343 | A | * | 5/1951 | Peebles et al. .......... 426/635 |
| 3,822,020 | A | * | 7/1974 | Hong ................... 210/248 |
| 4,825,551 | A |   | 5/1989 | Sherblom ............... 30/326 |
| 2005/0081385 | A1 | * | 4/2005 | Ho ..................... 30/123 |

FOREIGN PATENT DOCUMENTS

| CN | 87209706 U | 8/1988 |
| CN | 2149165 Y | 12/1993 |
| CN | 2163605 Y | 5/1994 |

* cited by examiner

*Primary Examiner*—Hwei-Siu C. Payer
(74) *Attorney, Agent, or Firm*—Rabin & Berdo, P.C.

(57) ABSTRACT

A multifunctional ladle includes a spoon-body which has a handle and a perforated spoon which mounts on the spoon-body by using a link rod, a spring and a screw. By pushing or pulling a switch on the handle which connects with the link rod, the perforated spoon can be detached from the spoon-body and in that case the multifunctional ladle can be used as a strainer, or the perforated spoon can be combined with the spoon-body and in that case the multifunctional ladle can be used as a spoon.

12 Claims, 2 Drawing Sheets

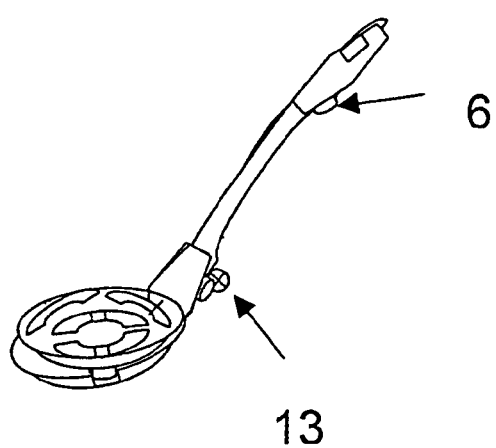
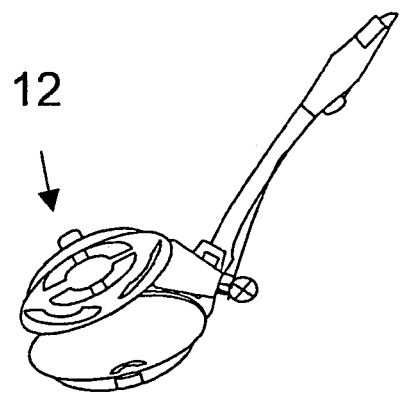
Fig 5
Fig 6

MULTIFUNCTIONAL LADLE

TECHNICAL FIELD

The present invention relates to a kind of kitchen equipment, and more particularly, to a multifunctional ladle.

BACKGROUND ART

The ladle is normally used for scooping out food, such as solid food, liquid diet with solid, soup or the like. For example, the function of the traditional ladle is singular, while lacking of other functions, such as screening, filtering, removing floating oil, funneling, straining, isolating, separating yolk from egg white, rapidly isolating the liquid and solids portion of the soup or the like. Therefore, the singular function of the traditional ladle is not able to meet the user's requirements.

In order to meet such requirements, U.S. Pat. No. 4,825,551 discloses a strainer ladle, which is a combination ladle strainer, wherein the strainer and ladle portions are separable and each portion is independently functionable as a ladle and a strainer, respectively. So such a strainer ladle only allows for liquid-solid separation of liquid-solid food mixtures.

CN2149165 and CN2163605 also disclose a combination of the ladle and the strainer, each of which is only used for liquid-solid separation.

CN87209706 discloses a five-purpose soup ladle, in which a single straining hole is provided on the bottom of the large ladle portion thereof while the hole may be blocked by a small ladle portion thereof, thereby stopping straining. The disadvantage of it is that it is difficult to fully pick up and remove the floating oil of the soup or in the meantime, a lot of delicious soup has also been picked up and removed.

CONTENTS OF THE INVENTION

It is, therefore, an object of the present invention to provide a multifunctional ladle, which is easy to use and simple in construction, and multifunctional.

A multifunctional ladle in accordance with the present invention comprises a handle, a ladle body and a strainer ladle matched with the ladle body and a controlling device, by which separation of the strainer ladle from the ladle body and combination of the strainer ladle with the ladle body are performed, and at the time of the strainer ladle being separate from the ladle body turnover of the strainer ladle is made by hand, engaged with the ladle body by means of a fixing device. A control switch of the controlling device is mounted on the handle and the controlling device includes a rod member, one end of which is connected to the control switch through a spring and another end of which is connected to the strainer ladle via an elastic device.

In the multifunctional ladle in accordance with the present invention, a straining hole is perforated on the bottom of the ladle body and a projection is provided on the bottom of the strainer ladle, which corresponds to the straining hole and is exactly blocked thereon by means of a spring force. Said spring lies inside the handle.

In the multifunctional ladle in accordance with the present invention, a short handle is provided on the strainer ladle, on the back of which a screw base is mounted, and a screw is fixed on the screw base through the elastic device. Also, a positioning hole, which corresponds to the screw base and is a rectangle, is located at the handle near to the ladle body. The elastic device may be a spring or an U-shaped spring. The strainer ladle has a hollowed out structure, on which some arched and/or circular holes are arranged and at the bottom centre of which a solid circle having a diameter of a chicken's egg yolk is provided. Any one of the handle, the ladle body, the strainer ladle, and the rod member is made of a kind of material selected from the group consisting of steel, stainless steel, wood, plastics, rubber, iron, copper, silver, gold, aluminum, aluminum alloy, zinc, zinc alloy, nickel or the like.

In accordance with the present invention, as the strainer and ladle body portions are separable and combinable, solids and liquid are readily separated from a liquid, solids mixture. When separated, it is capable of functioning as a funnel, a strainer ladle, a separator or a screening and filtering means, while when combined, it is capable of scooping up a liquid, solids mixture. In the latter case, in order to enable solids and liquid to be separated from the liquid, solids mixture, it may be carried out only by means of separating the strainer from the ladle body. Thus, separation of yolk from egg white, rapid isolation of floating oil and the soup or the like may be performed in a similar manner.

DESCRIPTION OF FIGURES

An embodiment of the present invention will now be described in detail, by way of example, in reference to the following drawings in which:

FIG. 5 is a perspective view of the multifunctional ladle in a separated position in accordance with the present invention; and FIG. 6 is a perspective view of the strainer to be turned over for cleaning.

MODE OF CARRYING OUT THE INVENTION

Figure 1:
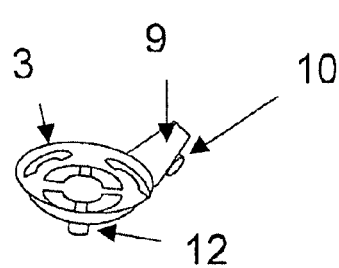
FIG. 1 is a perspective view of a strainer ladle in accordance with the present invention.

As shown in FIG.1, in a preferred embodiment of the present invention, the strainer ladle 3 has a bowl-shaped straining body and a short handle 9 which is integral with the ladle body. A screw base 10 is arranged on the back of the short handle 9. The strainer ladle also takes such a shape to match with the straining body. A solid circle member having a diameter of a chicken's egg yolk is provided on the bottom centre thereof. Some arched and/or circular holes are arranged around the solid circle member, a diameter of which depends on the design requirements. A main principle is that the liquid diet, such as soup or the like, may flow out of the strainer ladle through the holes of the strainer ladle, while the solid or semiliquid diet is not able to flow out and is retained in the strainer ladle 3. A projection 12 is arranged on the back of the strainer ladle 3 and under the solid circle member.

Figure 2:
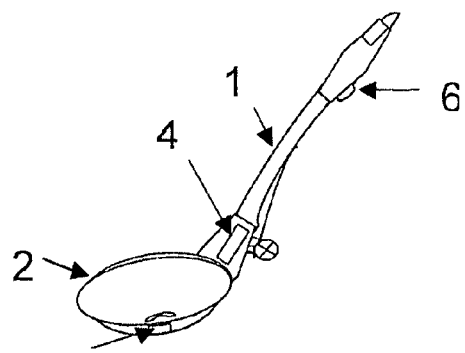
FIG. 2 is a perspective view of a ladle body connected to one end of a handle in accordance with the present invention.

Referring to FIG. 2, a multifunctional ladle in accordance with the present invention comprises a handle 1 and a ladle body 2 connected to one end of the handle and being integral with the handle 1. The ladle body 2 is in the form of a bowl or other shapes and is configured and sized for matching with the strainer ladle 3. The size of strainer ladle 3, of course, may be larger than or smaller than that of the ladle body 2 without having an effect on separation of solid or liquid diet. A straining drain hole 11 is perforated on the bottom of the ladle body 2, which corresponds to the projection 12, and is exactly blocked by means of the projection 12, thereby preventing the flow of liquid diet out from the ladle body 2.

A movable control switch is mounted on the handle 1 and inside the handle 1 a spring 5 is provided. A rectangular positioning hole 4 on the handle 1 is near to the ladle body 2. The positioning hole 4 may, of course, have other shapes.

Figure 3:
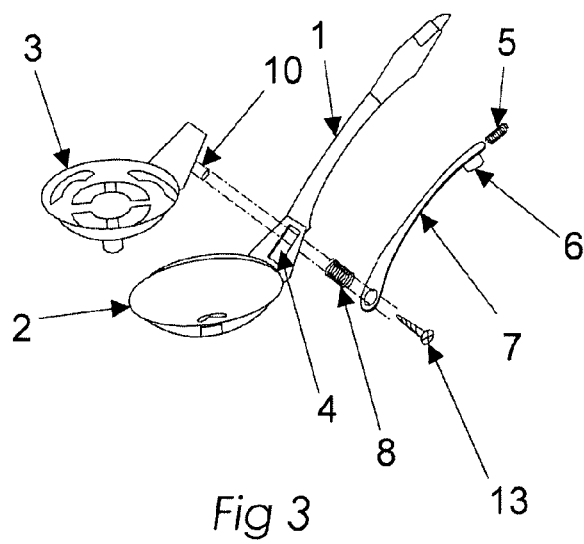
FIG. 3 is a partial view of a connection and fixture device used in between the strainer and the ladle body.

As shown in FIG. 3, a controlling device includes a control switch 6 and a rod member 7. One end of the rod member 7 is connected to the control switch 6 through a spring 5, and the other end of the rod member 7 is extended out the handle 1 and connected to the screw boss 10 through an elastic device 8. The control switch 6 is mounted outside the handle 1. The movement of the rod member 7 is carried out by means of up and down movement of the control switch 6. The elastic device 8 is a spring or a U-shaped spring.

When combinations of the strainer ladle 3 with the ladle body 2 is made by means of a fixing device, the screw boss 10 on the back of the short handle 9 of the strainer ladler 3 is extended through the rectangular positioning hole 4, while the short handle 9 is located on the positioning hole 4. Meanwhile, the fixing device such as a screw 13 is screwed in the screw boss 10 through the elastic device 8 in order to engage the strainer ladle 3 with the lade body 2. The short handle 9 and the screw boss 10, can also have other shapes, and still be connectable to the handle 1.

Figure 4:
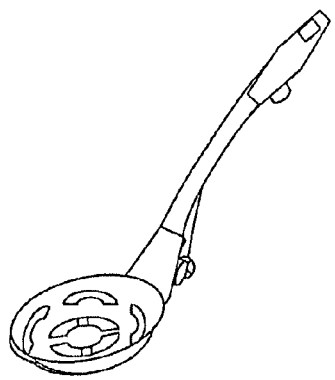
FIG. 4 is a perspective view of the multifunctional ladle in a combined position in accordance with the present invention.

Combination of the strainer ladle 3 with the ladle body 2 and separation of the strainer ladle 3 from the ladle body 2 are shown in FIGS. 4 and 5 respectively. When the control switch is moved, e.g., slid up, the strainer ladle 3 is also moved up by movement of the rod member 7, thereby separating the strainer ladle 3 from the ladle body 2. Simultaneously, the projection 12 of the strainer ladle 3 is divorced from the straining hole 11 of the ladle body 2, thus allowing liquid diet to flow out, as show in FIG. 5. When the control switch is moved down, the strainer ladle 3 is engaged with the ladle body 2 and at the same time the straining hole 11 is exactly blocked by the projection 12 under the elastic force applied by the spring 5, thereby allowing the device for scooping the soup.

As show in FIG. 5, the multifunctional ladle can be used as a funnel, a strainer ladle, a separator, or a screening and filtering means because the strainer ladle 3 has a hollowed out structure and the ladle body 2 has a straining hole. As shown in FIG. 4, the soup and the solid food may be scooped up as the straining hole 11 of the ladle body 2 has been exactly blocked by the projection 12 of the strainer ladle 3. At that time, if the control switch is moved up, as shown in FIG. 5, the soup will flow out. In the same way, the chicken's egg yolk may be isolated from egg white and the floating oil may be separated from the soup.

As shown in FIG. 6, if the control switch is moved up the strainer ladle can be turned over by hand, so it is easy to clean the strainer ladle 3.

In this embodiment of the present invention, any one of the handle, the ladle body 2, the strainer ladle 3 and the rod member 7 may be made of a material, but not limited to, selected from the group consisting of steel, stainless steel, wood, plastics, rubber, iron, copper, silver, gold, aluminum, aluminum alloy, zinc, zinc alloy, nickel or the like.

The invention claimed is:

1. A multifunctional ladle, comprising:
a handle;
a ladle body connected to one end of the handle;
a strainer ladle, which is matched with the ladle body and engaged with the ladle body; and
a controlling device, coupled to said strainer ladle, and which includes a control switch located on said handle, the control switch being slidable along the handle to a first position where the strainer ladle separates from the ladle body, and to a second position where the strainer ladle nests within the ladle body to combine the strainer ladle with the ladle body,
wherein when the strainer ladle is separated from the ladle body, the strainer ladle is positioned to strain solids from a liquid, with the liquid flowing through the strainer ladle and into the ladle body;
wherein when the strainer ladle is nested within the ladle body, the strainer ladle and the ladle body conjointly act as a ladle;
wherein the strainer ladle is invertible relative to the ladle body, by turning over the strainer ladle, relative to the ladle body, by hand; and
wherein the controlling device includes a rod member, one end of which is connected to the control switch and the other end of which is connected to the strainer ladle,
wherein the controlling device further includes a spring disposed inside of the handle, and which acts against the rod member to urge the control switch to the second position, and
wherein an elastic device is disposed between the other end of the rod member and the strainer ladle.

2. The multifunctional ladle as recited in claim 1, wherein the strainer ladle has a short handle, and a screw boss disposed on a back of the short handle, the handle having a positioning hole, the screw boss being inserted into the positioning hole and fixed to the rod member by a fixing device, and wherein the elastic device is sleeved over the screw boss.

3. The multifunctional ladle as recited in claim 2, wherein the positioning hole is adjacent to the ladle body.

4. The multifunctional ladle as recited in claim 1, wherein the elastic device is a coil spring or a U-shaped spring.

5. The multifunctional ladle as recited in claim 1, wherein any one of the handle, the ladle body, the strainer ladle and the rod member is made of a material selected from the group consisting of steel, stainless steel, wood, plastics, rubber, iron, copper, silver, gold, aluminum, aluminum alloy, zinc, zinc alloy, or nickel.

6. A multifunctional ladle, comprising:
a handle;
a ladle body connected to one end of the handle;
a strainer ladle, which is matched with the ladle body and engaged with the ladle body; and
a controlling device, coupled to said strainer ladle, and which includes a control switch located on said handle, the control switch being slidable along the handle to a first position where the strainer ladle separates from the ladle body, and to a second position where the strainer ladle nests within the ladle body to combine the strainer ladle with the ladle body,
wherein when the strainer ladle is separated from the ladle body, the strainer ladle is positioned to strain solids from a liquid, with the liquid flowing through the strainer ladle and into the ladle body;

wherein when the strainer ladle is nested within the ladle body, the strainer ladle and the ladle body conjointly act as a ladle;

wherein the strainer ladle is invertible relative to the ladle body, by turning over the strainer ladle, relative to the ladle body, by hand; and wherein a perforated drain hole is formed on a bottom of the ladle body, and a projection is provided on a bottom of the strainer ladle, which corresponds to the drain hole, so that the drain hole is exactly blocked by the projection when the control switch is in the second position.

7. The multifunctional ladle as recited in claim 6, wherein the strainer ladle has a concave shape, and has a plurality of arched and/or circular holes, a bottom centre of the strainer ladle being a solid circle member having a diameter of a chicken's egg yolk.

8. The multifunctional ladle as recited in claim 6, wherein the controlling device includes a rod member, one end of which is connected to the control switch and the other end of which is connected to the strainer ladle, wherein the controlling device further includes a spring disposed inside of the handle, and which acts against the rod member to urge the control switch to the second position, and wherein an elastic device is disposed between the other end of the rod member and the strainer ladle.

9. The multifunctional ladle as recited in claim 8, wherein the strainer ladle has a short handle, and a screw boss disposed on a back of the short handle, the handle having a positioning hole, the screw boss being inserted into the positioning hole and fixed to the rod member by a fixing device, and wherein the elastic device is sleeved over the screw boss.

10. The multifunctional ladle as recited in claim 9, wherein the positioning hole is adjacent to the ladle body.

11. The multifunctional ladle as recited in claim 8, wherein any one of the handle, the ladle body, the strainer ladle and the rod member is made of a material selected from the group consisting of steel, stainless steel, wood, plastics, rubber, iron, copper, silver, gold, aluminum, aluminum alloy, zinc, zinc alloy, or nickel.

12. The multifunctional ladle as recited in claim 6, wherein the strainer ladle has a concave shape, and has a plurality of arched and/or circular holes, a center of the bottom of the strainer ladle being a solid circle member having a diameter of a chicken's egg yolk.

* * * * *